United States Patent

[11] 3,596,867

| [72] | Inventor | Claes Vilhelm Allander<br>Stockholm, Sweden |
|---|---|---|
| [21] | Appl. No. | 750,978 |
| [22] | Filed | Aug. 7, 1968 |
| [45] | Patented | Aug. 3, 1971 |
| [73] | Assignee | AB Braas Spegelindustri<br>Brass, Sweden |
| [32] | Priority | Aug. 18, 1967 |
| [33] | | Sweden |
| [31] | | 11,582 |

[54] ATTACHMENTS FOR REARVIEW MIRRORS
4 Claims, 3 Drawing Figs.

[52] U.S. Cl............................................. 248/475,
24/217
[51] Int. Cl........................................ B60r 1/04
[50] Field of Search........................... 248/475-
—487, 223—225; 24/218, 217, 216; 350/288;
287/20.5; 85/8.8

[56] References Cited
UNITED STATES PATENTS
1,303,401 5/1919 Sanger........................... 24/218

| 1,448,028 | 3/1923 | Gruen........................ | 24/218 |
|---|---|---|---|
| | | FOREIGN PATENTS | |
| 487,029 | 3/1918 | France....................... | 24/216 |
| 653,153 | 11/1928 | France....................... | 24/217 |
| H25898II<br>63c | 5/1956 | Germany.................... | 248/479 |
| 514,323 | 3/1921 | France....................... | 24/217 |
| 1,246,937 | 10/1960 | France....................... | 248/475 |

Primary Examiner—Marion Parsons, Jr.
Attorney—Beveridge and De Grandi

ABSTRACT: An attachment for rearview mirrors in vehicles, comprising a plate fixedly secured to an arm for the mirror and a plate attachable to the vehicle. One of these plates has a projecting pin provided with a head, and the other plate has a recess corresponding to said pin and provided with bar springs at the edges of said recess. The two plates are also provided with one or more protuberances and depressions corresponding to each other and adapted to engage each other when the plates are secured to one another by means of said pin.

Patented Aug. 3, 1971

3,596,867

INVENTOR
CLAES VILHELM ALLANDER

BY Beveridge & De Grandi

ATTORNEYS

ATTACHMENTS FOR REARVIEW MIRRORS

This invention relates to an attachment for rearview mirrors and the like in automotive vehicles, said attachment comprising a plate fixedly secured to an arm for the mirror, and a plate attachable to the vehicle. The attachment is essentially characterized in that one plate has a projecting pin provided with a head, while the other plate has a recess corresponding to said pin and bar springs or the like at the edges of the recess for securing the plates to each other when the pin engages the recess, and in that both plates are provided with one or more protuberances and depressions corresponding to and adapted to engage each other when said plates are secured to one another.

The present invention provides a rearview mirror attachment, the components of which can be detached from one another when the forces and moments occurring between the components exceed certain predetermined values which are a combination of certain breakoff functions. The breakoff characteristics thus are essentially independent of the direction of the breakoff forces, which is of paramount importance for the prevention of damage.

The invention will now be described in detail, reference being had to the accompanying drawing illustrating an embodiment, chosen by way of example, of the mirror attachment of the invention.

Figure 1:
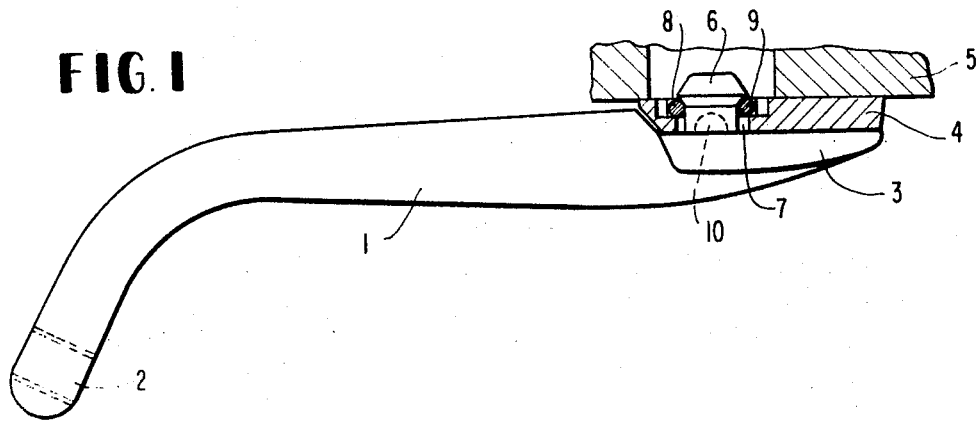
FIG. 1 is a lateral view of the attachment, partly in section along line I–I in FIG. 2.
Figure 2:
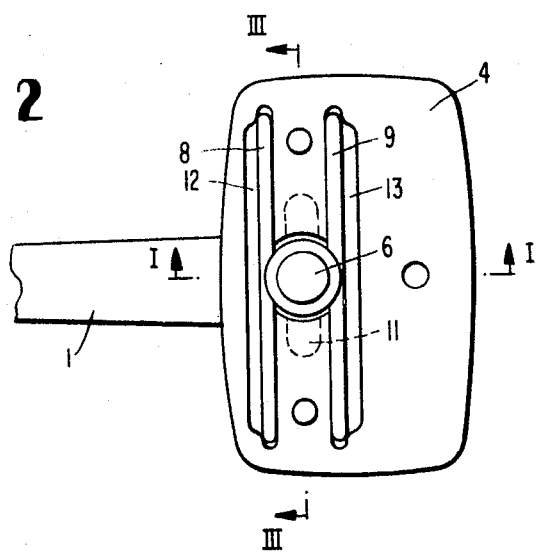
FIG. 2 shows the attachment viewed from below.
Figure 3:
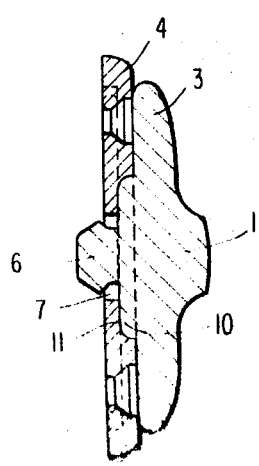
FIG. 3 is a section along line III–III in FIG. 2.

1 is the arm to the outer end 2 of which the mirror is to be attached. A plate 3 is fixedly connected with the inner end of the arm 1. Together with the plate 4 which is to be attached to the vehicle body, for instance the ceiling 5, the plate 3 forms the rearview mirror attachment.

The plate 3 has a projecting pin 6 provided with a head, and the plate 4 has a recess 7 for receiving the pin 6 and bar springs 8 and 9 or the like at the edges of said recess for fixing the plates 3 and 4 to each other when the pin 6 engages the recess 7. Thus, the bar springs 8 and 9 are adapted to engage the constricted portion of the pin 6 below the head thereof. In addition, the two plates 3 and 4 have protuberances 10 and depressions 11 corresponding to and adapted to engage each other when the plates 3 and 4 are secured to one another.

The bar springs 8 and 9 are placed each in one groove 12 and 13 in the plate 4. When the bar springs are two, as in the illustrated embodiment, the grooves 12 and 13 are preferably parallel. The grooves 12 and 13 are so formed as to fix the ends of the bar springs 8 and 9, but permit the remaining portions of said bar springs 8 and 9 to move in a plane parallel to the plate 4. The groove depth being approximately equal to the diameter of the bar springs 8 and 9, and the plate 4 being secured to a fixed base, the bar springs 8 and 9 are practically immovable at right angles to the plate 4.

According to a simple embodiment, the plate 3 could have but one protuberance 10 or depression 11, while the plate 4 would then have a corresponding depression 11 or protuberance 10. According to the illustrated and preferred embodiment, however, both plates 3 and 4 are provided with the mating protuberances 10 and depressions 11 at points diametrically located relative to the pin 6 and the recess 7. The protuberances 10 could be in the form of warts, but for production technical reasons they consist preferably of a beam extending on both sides of the pin 6 and the recess 7, respectively. The beam 10 has a rounded, preferably essentially semicircular cross section, as is indicated in FIG. 1.

The arm 1 is secured to the plate 4 by pressing the late 3 against the plate 4, whereby the leading conical part of the pin 6 pushes the bar springs 8 and 9 aside so that the springs, when the plates 3 and 4 are moved into engagement with one another, will snap in under the head. At the same time, the arm 1 is fixed against rotation by the engagement of the protuberances 10 with the depressions 11.

The arm is broken off when the load thereon exceeds the value corresponding to the maximum capacity of the bar springs 8 and 9 of holding the pin 6. The protuberances 10 and the depressions 11 serve to fix the components of the attachment relative to each other against rotation and to push the attachment components apart upon breakage due to a torque so that the pin 6 is disengaged from the bar springs 8 and 9.

The invention is not limited to the above described and illustrated embodiment but can be modified within the scope of the appended claims.

What I claim and desire to secure by Letters Patent is:

1. In a breakaway device for attaching a rearview mirror in an automobile, the combination comprising:
   first plate means for fixedly mounting said mirror,
   pin means projecting from said first plate means, said pin means having a conically shaped portion at its outer end and an inwardly directed shoulder means intermediate said portion and said plate means,
   at least one protuberance projecting from said plate means in the same direction as said pin means,
   second plate means fixedly mounted in said automobile having an opening therein of a size and shape to allow insertion and withdrawal of said pin means,
   a depression in said second plate means corresponding to each of said protuberances, located so that each protuberance projects into the corresponding depression when said pin means is inserted into said opening, a pair of laterally spaced grooves formed in one surface of said second plate, said grooves extending one on each side of said opening and spaced apart a distance less than the transverse dimension of said opening whereby said opening extends into each of said grooves intermediate their ends, and
   an elongated normally substantially straight bar spring mounted in each of said grooves and extending into said opening for engaging and releasably retaining said shoulder means when said pin means is inserted into said opening, said grooves having a transverse dimension greater than that of said bar springs at least in the area of said opening to permit limited movement of the adjacent portion of said bar springs toward and away from said opening upon a movement of said pin means into or out of said opening.

2. The device of claim 1, wherein each of said protuberances consists of a beam extending on one side of said pin and having essentially semicircular cross section.

3. The device of claim 1 wherein said bar springs are of substantially circular cross section throughout their length.

4. The device of claim 3, wherein each of said protuberances and depressions are diametrically located relative to said pin means.